(12) United States Patent
Bergström et al.

(10) Patent No.: US 8,817,713 B2
(45) Date of Patent: Aug. 26, 2014

(54) METHOD AND ARRANGEMENT IN A TELECOMMUNICATION SYSTEM

(75) Inventors: Andreas Bergström, Vikingstad (SE);
Hákan Axelsson, Linköping (SE); Jens Bergqvist, Linköping (SE); Paul Schliwa-Bertling, Ljungsbro (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 630 days.

(21) Appl. No.: 13/020,258

(22) Filed: Feb. 3, 2011

(65) Prior Publication Data

US 2011/0194410 A1 Aug. 11, 2011

Related U.S. Application Data

(60) Provisional application No. 61/303,066, filed on Feb. 10, 2010.

(51) Int. Cl.
*H04W 4/00* (2009.01)
(52) U.S. Cl.
USPC .......................................... 370/329; 370/328
(58) Field of Classification Search
None
See application file for complete search history.

(56) References Cited

U.S. PATENT DOCUMENTS

2002/0041583 A1 4/2002 Lintulampi et al.
2002/0181422 A1* 12/2002 Parantainen et al. ......... 370/337
2009/0168709 A1* 7/2009 Hole et al. .................... 370/329
2009/0219864 A1* 9/2009 Parolari ........................ 370/329
2011/0007697 A1* 1/2011 Ryu et al. ..................... 370/329

FOREIGN PATENT DOCUMENTS

EP 1786225 A1 5/2007

OTHER PUBLICATIONS

3rd Generation Partnership Project, "Technical Specification Group GSM/EDGE Radio Access Network; General Packet Radio Service (GPRS); Mobile Station (MS)—Base Station System (BSS) Interface; Radio Link Control/Medium Access Control (RLC/MAC) Protocol (Release 9)," 3GPP TS 44.060 v9.2.0, pp. 1-249; Dec. 2009.
3rd Generation Partnership Project, "Technical Specification Group GSM/EDGE Radio Access Network, Channel Coding (Release 9)," 3GPP TS 45.003 v9.0.0, pp. 1-321, Dec. 2009.
3rd Generation Partnership Project, Source: Siemens, "Outstanding Issues of the Multiple TBF Concept," 3GPP TSG GERAN #6, Tdoc GP-011548, Agenda Item 7.2.5.6, pp. 1-15, Naantali, Finland, Aug. 27-31, 2001.

(Continued)

*Primary Examiner* — Jutai Kao
(74) *Attorney, Agent, or Firm* — Coats & Bennett, PLLC

(57) ABSTRACT

A mobile station for use with a mobile network, and being arranged to be assigned one or more Temporary Block Flows, TBFs, by the mobile network, and to receive RLC/MAC Blocks from the mobile network, each of which RLC/MAC Blocks is associated with one of said TBFs, and to identify a received RLC/MAC Block by means of a Temporary Flow Identity, TFI, which has been assigned by the mobile network to the TBF with which the RLC/MAC Block is associated. The mobile station is arranged to recognize TFIs which belong to a first group of TFIs as well as TFIs which belong to a second group of TFIs, with a TFI in the second group comprising a TFI in the first group of TFIs together with additional information in the received RLC/MAC block.

36 Claims, 5 Drawing Sheets

(56) References Cited

OTHER PUBLICATIONS

3rd Generation Partnership Project, Source: Siemens, "Multiple Parallel Bearers Concept Paper," 3GPP TSG GERAN #5, Tdoc GP-011113, Agenda Item 7.2.5.9, pp. 1-17, May 28-Jun. 1, 2001, Chicago, IL, US.

3rd Generation Partnership Project, Technical Specification Group Services and System Aspects; "Service Requirements for Machine-Type Communications; Stage 1(Release 10)," 3GPP TS 22.368 v1.1.1, pp. 1-23, Nov. 2009.

* cited by examiner

| Legacy TFI | | Extended TFI, eTFI | | |
|---|---|---|---|---|
| Code Point | Value | Code Point | Value | Assigned to TBF |
| | | | | |
| 00000 | 0 | N/A | N/A | Legacy TBF 0 |
| 00001 | 1 | N/A | N/A | Legacy TBF 1 |
| 00010 | 2 | N/A | N/A | Legacy TBF 2 |
| 00011 | 3 | N/A | N/A | Legacy TBF 3 |
| …. | | | | |
| 01110 | 14 | N/A | N/A | Legacy TBF14 |
| 01111 | 15 | N/A | N/A | Legacy 15 |
| | | | | |
| 10000 | 16 | 00 | 0 | New TBF |
| 10000 | 16 | 01 | 1 | New TBF |
| 10000 | 16 | 10 | 2 | New TBF |
| 10000 | 16 | 11 | 3 | New TBF |
| 10001 | 17 | 00 | 0 | New TBF |
| 10001 | 17 | 01 | 1 | New TBF |
| 10001 | 17 | 10 | 2 | New TBF |
| 10001 | 17 | 11 | 3 | New TBF |
| ……. | | | | New TBF |
| 11111 | 31 | 00 | 0 | New TBF |
| 11111 | 31 | 01 | 1 | New TBF |
| 11111 | 31 | 10 | 2 | New TBF |
| 11111 | 31 | 11 | 3 | New TBF |

Fig 2

| L | 31-L | Value of $L*2^M$ | | | | | | | |
|---|---|---|---|---|---|---|---|---|---|
| | | M=0 | M=1 | M=2 | M=3 | M=4 | M=5 | .. | M=9 |
| 0 | 31 | 0 | 0 | 0 | 0 | 0 | 0 | .. | 0 |
| 1 | 30 | 1 | 2 | 4 | 8 | 16 | 32 | .. | 512 |
| 2 | 29 | 2 | 4 | 8 | 16 | 32 | 64 | .. | 1024 |
| 3 | 28 | 3 | 6 | 12 | 24 | 46 | 96 | .. | 1536 |
| 4 | 27 | 4 | 8 | 16 | 32 | 64 | 128 | .. | 2048 |
| 5 | 26 | 5 | 10 | 20 | 40 | 80 | 160 | .. | 2560 |
| 6 | 25 | 6 | 12 | 24 | 48 | 96 | 192 | .. | 3072 |
| 7 | 24 | 7 | 14 | 28 | 56 | 112 | 224 | .. | 3584 |
| 8 | 23 | 8 | 16 | 32 | 64 | 128 | 256 | .. | 4096 |
| 9 | 22 | 9 | 18 | 36 | 72 | 144 | 288 | .. | 4608 |
| 10 | 21 | 10 | 20 | 40 | 80 | 160 | 320 | .. | 5120 |
| 11 | 20 | 11 | 22 | 44 | 88 | 176 | 352 | .. | 5632 |
| 12 | 19 | 12 | 24 | 48 | 96 | 192 | 384 | .. | 6144 |
| 13 | 18 | 13 | 26 | 52 | 104 | 208 | 416 | .. | 6656 |
| 14 | 17 | 14 | 28 | 56 | 112 | 224 | 448 | .. | 7168 |
| 15 | 16 | 15 | 30 | 60 | 120 | 240 | 480 | .. | 7680 |
| 16 | 15 | 16 | 32 | 64 | 128 | 256 | 512 | .. | 8192 |
| 17 | 14 | 17 | 34 | 68 | 136 | 272 | 544 | .. | 8704 |
| 18 | 13 | 18 | 36 | 72 | 144 | 288 | 576 | .. | 9216 |
| 19 | 12 | 19 | 38 | 76 | 152 | 304 | 608 | .. | 9728 |
| 20 | 11 | 20 | 40 | 80 | 160 | 320 | 640 | .. | 10240 |
| 21 | 10 | 21 | 42 | 84 | 168 | 336 | 672 | .. | 10752 |
| 22 | 9 | 22 | 44 | 88 | 176 | 352 | 704 | .. | 11264 |
| 23 | 8 | 23 | 46 | 92 | 184 | 368 | 736 | .. | 11776 |
| 24 | 7 | 24 | 48 | 96 | 192 | 384 | 768 | .. | 12288 |
| 25 | 6 | 25 | 50 | 100 | 200 | 400 | 800 | .. | 12800 |
| 26 | 5 | 26 | 52 | 104 | 208 | 416 | 832 | .. | 13312 |
| 27 | 4 | 27 | 54 | 108 | 216 | 432 | 864 | .. | 13824 |
| 28 | 3 | 28 | 56 | 112 | 224 | 448 | 896 | .. | 14336 |
| 29 | 2 | 29 | 58 | 116 | 232 | 464 | 928 | .. | 14848 |
| 30 | 1 | 30 | 60 | 120 | 240 | 480 | 960 | .. | 15360 |
| 31 | 0 | 31 | 62 | 124 | 248 | 496 | 992 | .. | 15872 |

Fig 3

METHOD AND ARRANGEMENT IN A TELECOMMUNICATION SYSTEM

RELATED APPLICATIONS

This application claims priority to U.S. Provisional Patent Application No. 61/303,066, filed Feb. 10, 2010 and incorporated by reference herein in its entirety.

TECHNICAL FIELD

The present invention discloses a method and an arrangement for a telecommunications system, in particular a method and arrangements for increasing the Temporary Flow Identity addressing space.

BACKGROUND

So far, the traffic generated in mobile networks such as e.g. GERAN and UTRAN has mostly been dominated by services that require human interaction, such as e.g. regular speech calls, web-surfing, sending MMS, doing video-chats etc, and the same traffic pattern is also anticipated for E-UTRAN. As a natural consequence, these mobile networks are designed and optimized primarily for these "Human Type Communication", HTC, services.

There is, however, an ever-increasing market segment for Machine Type Communication, MTC, services, which do not necessarily need human interaction. MTC services include a very diverse flora of applications, ranging from, for example, vehicle applications (such as automatic emergency calls, remote diagnostics and telematics, vehicle tracking etc.) to gas and power meter readings, and also network surveillance and cameras, to just give a few examples. The requirements that MTC services put on the mobile network will without any doubt significantly differ from what is provided by today's HTC-optimized mobile networks, as outlined in 3GPP TS 22.368. The amount of MTC and HTC devices could reach a total of almost 50 billion, i.e. $50*10^9$, by the year 2020.

Thus, in order for mobile networks such as GERAN and UTRAN to be competitive for these mass market MTC applications and devices, it is important to optimize the support of such networks for MTC communication.

One of the critical issues in e.g. GERAN is how the network could be able to distinguish and properly address such a vast number of devices for the case of simultaneous data transfer on shared radio resources, since the available addressing spaces may not be sufficient. One of the identifiers that may be a bottleneck in this respect is the so called Temporary Flow Identity, TFI, which is assigned by the GERAN network to each Temporary Block Flow, TBF, for the purpose of e.g. identifying a particular TBF and the transmitted RLC/MAC blocks associated with that TBF.

Each Temporary Block Flow is assigned a Temporary Flow Identity, TFI, value by the mobile network. This TFI value is unique among concurrent TBFs in the same direction, i.e. uplink or downlink, on all Packet Data Channels, PDCHs, used for the TBF. The same TFI value may be used concurrently for other TBFs on other PDCHs in the same direction and for TBFs in the opposite direction, and hence a TFI is a unique identifier on a given resource such as a PDCH. This limits the number of concurrent TBFs and thus the number of devices that may share the same radio resources.

The TFI itself is a 5-bit field encoded as binary number in the range 0 to 31, which is typically provided to the mobile station, MS, by the GERAN network upon assignment of the TBF.

An RLC/MAC block associated with a certain TBF is thus identified by the TFI together with, in the case of an RLC data block, the direction, uplink or downlink, in which the RLC data block is sent, and in the case of an RLC/MAC control message, by the direction in which the RLC/MAC control message is sent and the message type. If Short Sequence Number (SSN)-based Fast ACK/NACK Reporting, FANR, is used, then the TFI which identifies the TBF being acknowledged is included in the Piggy-backed ACK/NACK, see 10.3a.5 of 3GPP TS 44.060.

This means that, for example, every time an MS receives a downlink data or control block, it will use the included TFI field to determine if this block belongs to any (there can be more than one) of the TBFs associated with that very MS. If so, the block is obviously intended for this MS, whereupon the corresponding payload is decoded and delivered to upper layers, and is discarded otherwise. In the uplink direction, the behavior is the same, i.e. the mobile network uses the TFI value to identify blocks that belong to the same TBF.

The numbers of possible TFI values are limited by the available 5 bits, which thus allows for 32 individual values. This may appear sufficient, and has until now provided no significant limitation. There are however a number of indicators that the TFI addressing space may be a limiter in the future.

If a TBF is assigned to be used on more than one PDCH (which is most often the case) the number of usable TFIs per PDCH drastically decreases. Assume e.g. that all TBFs are used on all 8 PDCHs, This means that the average number of TFIs per PDCH will be 32/8=4, as compared to the 32 TFIs per PDCH that would be the case otherwise. Since it in most situations is desirable to spread a TBF over as many PDCHs in order to improve the statistical multiplexing gain and flexibility, this has the drawback of reducing the potential number of TBFs that can be supported on any given set of PDCHs, such as e.g. a Transceiver (TRX).

With recent additions to the 3GPP standards which allow the use of multiple TBFs associated with one and the same MS by means of Multiple TBF procedures as described in 3GPP TS 44.060 and/or Enhanced Multiplexing of a Single TBF (EMST) (also described in 3GPP TS 44.060), the number of TBFs associated with any given MS will no longer be limited to one per direction. One particular MS could now e.g. in the downlink have one TBF for a web-surfing session, another for an ongoing VoIP call (or an audio-streaming session with e.g. Spotify) and finally a third for a messaging service such as MSN. The benefit on splitting these particular services over different TBFs is of course that they all have different service requirements, but an obvious drawback is that more TFIs are needed.

The amount of PS, Packet Switched, traffic in a typical GERAN network is continuously and rapidly increasing already today, with the usage of classical 'HTC' services as described above. If, in addition, bearing in mind the anticipated ~50 billion 'HTC'+'MTC' devices in the next ten of years, it is more than likely that the PS traffic volume in GERAN, and implicitly the amount of TBFs per TRX, will increase manifold. It is not at all an unlikely situation that for these kinds of services, it would be beneficial to multiplex perhaps dozens or more users of the same uplink PDCH.

SUMMARY

Bearing in mind the background outlined above, it is a purpose of the present invention to expand the addressing space for TFI values. This purpose is achieved by the present invention in that it discloses a mobile station for use with a mobile network. The mobile station is arranged to be assigned one or more Temporary Block Flows, TBFs, by the mobile network, and to receive RLC/MAC Blocks from the mobile network. Each of the received RLC/MAC Blocks is associated with one of the TBFs, and the mobile station is arranged to identify a received RLC/MAC Block by means of a Temporary Flow Identity, TFI, which has been assigned by the mobile network to the TBF with which the RLC/MAC Block is associated.

The mobile station is arranged to recognize TFIs which belong to a first group of TFIs as well as TFIs which belong to a second group of TFIs, with a TFI in the second group comprising a TFI in the first group of TFIs together with additional information in the received RLC/MAC block.

Another way of expressing this is that each TFI in the second group of TFIs comprises one of the TFIs in the first group of TFIs together with information in an RLC/MAC block, and that different TFIs in the first group are used together with additional information in the received RLC/MAC block in order to obtain the TFIs in the second group.

Thus, a mobile station of the invention can either identify RLC/MAC Blocks by means of "traditional" TFIs, or by means of the second group of TFIs which can be seen as "extended" TFIs compared to the traditional TFIs.

Using the extended TFIs, the mobile station obtains more "addressing space" for TBFs, since the extended TFIs comprise information in at least some of the first group of TFIs, i.e. the "traditional" TFIs, together with information in an RLC/MAC Block, which naturally leads to larger numbers being possible for TFIs and thus for assigning to TBFs.

In embodiments, the mobile station is arranged to transmit an RLC/MAC Block to the mobile network on a TBF, and to associate such a transmitted RLC/MAC Block with a TBF by means of a TFI which belongs to either the first group of TFIs or to the second group of TFIs.

In embodiments, the mobile station is arranged to inform the mobile network of its ability to recognize TFIs which belong to the second group of TFIs and/or to associate transmitted RLC/MAC Blocks with a TBF by means of a TFI which belongs to the second group of TFIs.

In embodiments, the mobile station is arranged to inform the mobile network of its ability with the "new" (second group) TFIs by means of the Information Element MS Radio Access Capability, in which Information Element the mobile station is arranged to use one bit for this purpose. Naturally, more than one bit can also be used for this purpose.

In embodiments, the mobile station is arranged to inform the mobile network of its ability with the "new" TFIs by means of an access burst. In some such embodiments, the access burst is a binary value in the message EGPRS PACKET CHANNEL REQUEST, and in other embodiments, the access burst is a training sequence that the mobile station uses when transmitting the message EGPRS PACKET CHANNEL REQUEST.

In embodiments, the mobile station is arranged to receive information from the mobile network that the mobile station should use information in at least some of the first group of TFIs together with information in an RLC/MAC Block in order to identify a TFI which belongs to the second group of TFI. In some such embodiments, the mobile station is arranged to receive said information from the mobile network upon assignment or reconfiguration to the mobile station from the mobile network of a TBF.

In embodiments, the mobile station is a mobile station for a GERAN mobile network.

The invention also discloses a mobile network which is arranged to assign one or more Temporary Block Flows, TBFs, to a mobile station. The mobile network is also arranged to assign a Temporary Flow Identity, TFI, to each of said TBFs and to transmit RLC/MAC Blocks to the mobile station. In addition, the mobile network is also arranged to associate each transmitted RLC/MAC Block with one of said TBFs by means of a TFI.

The mobile network is arranged to choose the TFIs from a first or a second group of TFIs, and to form the TFIs of the second group by a TFI in the first group of TFIs and information in the transmitted RLC/MAC Block.

Another way of expressing this is that the TFIs in the second group of TFIs are formed by means of one of the TFIs in the first group of TFIs together with information in an RLC/MAC block, and that different TFIs in the first group are used together with additional information in the received RLC/MAC block in order to form the TFIs in the second group.

In the network, the TFIs are assigned to the TBFs by the RLC protocol layer in the BSC/PCU, Base Station Controller/Packet Control Unit.

In embodiments, the mobile network is arranged to receive RLC/MAC Blocks from a mobile station and to identify such received RLC/MAC Blocks by means of a TFI from the first or the second group of TFIs.

In embodiments, the mobile network is arranged to receive information from a mobile station that the mobile station is arranged to recognize TFIs which belong to the second group of TFIs and/or to associate transmitted RLC/MAC Blocks with a TBF by means of a TFI which belongs to the second group of TFIs. In some such embodiments, the mobile network is arranged to receive said information from a mobile station by means of the Information Element MS Radio Access, in which Information Element the mobile station uses one bit for this purpose. In other such embodiments, the mobile network is arranged to receive said information from a mobile station by means of an access burst. In such embodiments, the mobile network is arranged to receive said access burst as a binary value in the message EGPRS PACKET CHANNEL REQUEST, or as a training sequence that the mobile station uses when transmitting the message EGPRS PACKET CHANNEL REQUEST.

In embodiments, the mobile network is arranged to transmit information to the mobile station to use information in at least some of the first group of TFIs together with information in an RLC/MAC Block in order to form a TFI which belongs to the second group of TFI.

In embodiments, the mobile network is arranged to transmit said information to the mobile station upon assignment to the mobile station of a new TBF, or reconfiguration of a TBF to the mobile station. In embodiments, the mobile network is arranged to place said information in an RLC/MAC header in the Length Indicator in an RLC data block.

In embodiments, the mobile network is a GERAN mobile network.

In addition, the invention also discloses a method for use in communication between a mobile network and a mobile station.

BRIEF DESCRIPTION OF THE DRAWINGS

The invention will be described in more detail in the following, with reference to the appended drawings, in which FIGS. 2 and 3 show a principle used in the invention.

DETAILED DESCRIPTION

Figure 1:
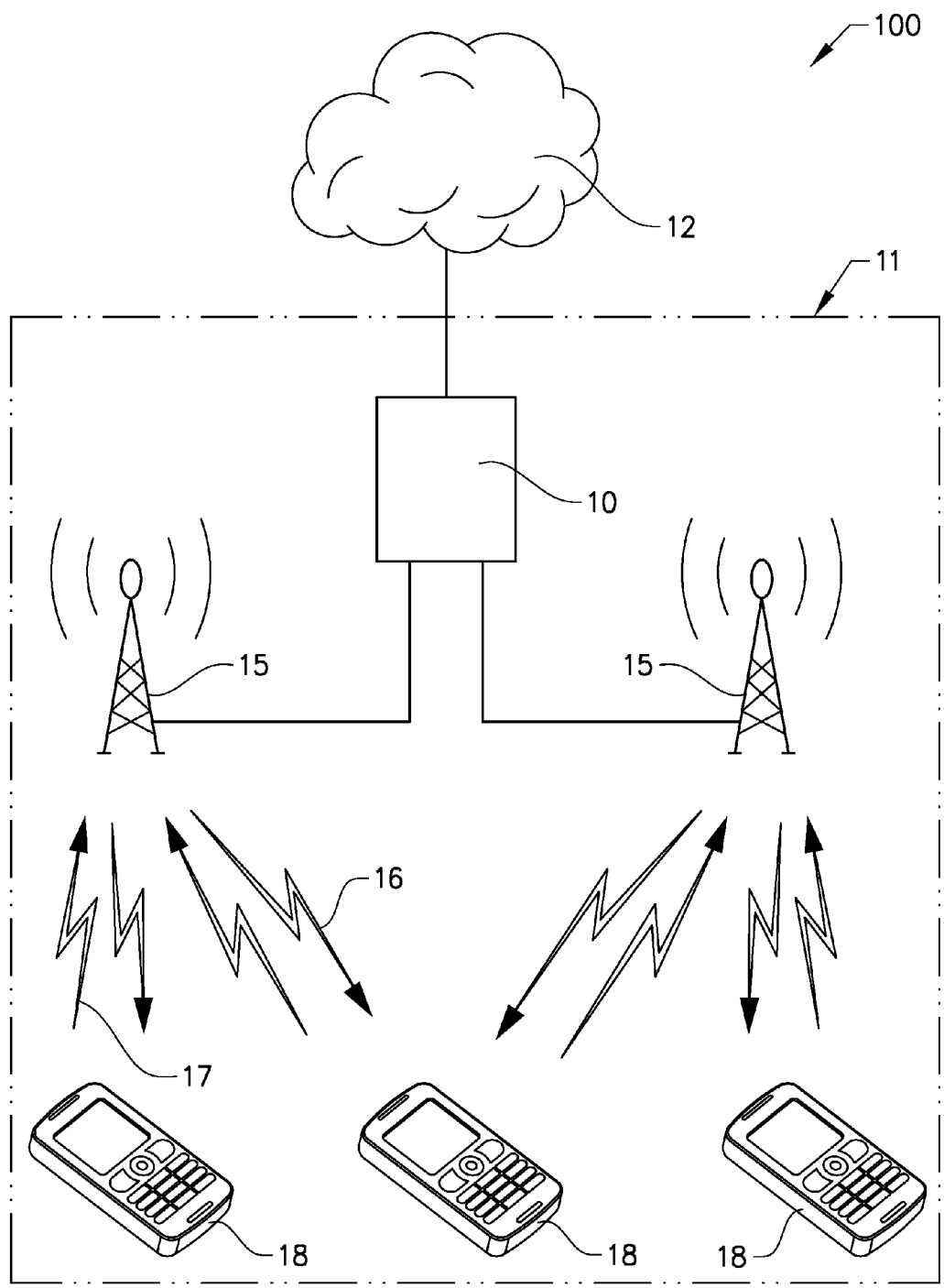
FIG. 1 shows a schematic view of a mobile network.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows a communication network system 100 including a Radio Access Network, RAN 11, such as the GSM Network. The RAN 11 comprises at least one Radio Base Station, RBS 15, and in FIG. 1 there are two RBSs 15 shown. The RBSs 15 are shown as being connected to a common Base Station Controller, BSC 10, although the RBSs 15 may also be connected to more than one BSC, and the RBSs 15 do not necessarily have to be connected to one and the same BSC. The RAN 11 is connected to a Core network, CN, 12. The RAN 11 and the CN 12 provide communication and control for a plurality of mobile stations, MS 18, each of which uses downlink, DL, channels 16 and uplink, UL, channels 17. For reasons of clarity, only one of the uplink channels is denoted 17 and only one of the downlink channels is denoted 16.

On the downlink channel 16, the RBSs 15 transmit to the mobile stations 18 at respective power levels, and on the uplink channel 17, the mobile stations 18 transmit to the RBS 15 at respective power levels.

RLC/MAC Blocks are transferred between an RBS 15 and a mobile station 18, where each RLC/MAC Block is associated with a so called Temporary Block Flow, abbreviated as TBF. A TBF is identified by means of its so called Temporary Flow Identity, abbreviated as TBI. As described above, the present invention provides a way of extending the number of TFIs available in a mobile network 11 such as the one in FIG. 1. Thus, new TFIs are introduced by the invention, and such TFIs will from now on also be referred to as "new TFIs", or "extended TFIs", abbreviated as "eTFIs", while TFIs which follow the principles of the prior art will be referred to as "legacy TFIs".

The new TFIs are obtained by means of reserving one or more binary values, also sometimes referred to as "code points", from the legacy TFI fields or addressing space and introducing a new, separate 'extended TFI field', eTFI, in transmitted downlink RLC/MAC blocks, and in some embodiments, in transmitted uplink RLC/MAC blocks as well. The reserved legacy TFI code points are then combined with the eTFI field in order to obtain the total available TFI addressing space.

In one embodiment of the invention, the legacy TFI code point which is combined with the eTFI code point is assigned dynamically, i.e. on a per need basis.

The bits to be used for the new eTFI field can be taken from the unused spare bits that exist in many of the RLC/MAC headers of the RLC/MAC Blocks, or, as an alternative, one or more new RLC/MAC Headers is/are defined that has/have room for this eTFI field.

Other alternatives include either using the existing PAN (Piggy back ACK/NACK) field for the eTFI field, or to use different Training Sequence Codes, TSCs, sent orthogonally to the downlink RLC/MAC block. In 3GPP GERAN Rel-9 a work item named VAMOS is standardized, where new orthogonal training sequences are introduced. These training sequences could be re-used for the eTFI.

There is also a need for a mobile device to be able to inform the mobile network about its capability to understand the eTFIs, i.e. the eTFI field, and for the mobile network to be able to assign an eTFI to a mobile device which is "eTFI capable". Appropriate signaling protocols for signaling between the network and the mobile device is therefore introduced by the invention, as will be described in the following. These protocols include letting the mobile device indicate its capabilities to understand the eTFI field in the MS Radio Access Capability IE, in which case one (or more) additional bit is added to this IE for this purpose.

An alternative solution for a mobile device to inform the mobile network about its capability to understand the eTFI field is to use a new type of access burst in addition to the "legacy" access bursts. This access burst is then to be used by these new devices. Whenever the mobile network thus detects this new access burst, the mobile network will know that the access burst originates from mobile station device that is capable of reading the eTFI field.

Thus, at least three aspects of the invention can be identified:

The introduction of a new eTFI field which will be combined with certain dynamically reserved code points in the legacy TFI field in order to form a larger total TFI addressing space.

Where and how to convey the new eTFI field when transmitted in the downlink in order to schedule a specific mobile station for uplink transmission.

The signaling aspects: The necessary means for the control plane to be used by the mobile station to communicate its capabilities with regards to the support of eTFI field and for the mobile network to assign both a legacy TFI and an eTFI to the mobile station.

These aspects of the invention will be described in detail below.

A New eTFI Field:

Embodiments herein use a code point (i.e. a binary value) from the legacy TFI addressing space and combine it with a new, separate extended TFI field in a transmitted downlink RLC/MAC block. The legacy TFI code points are then combined with the eTFI field in order to increase the total available TFI addressing space. The legacy TFI code points that are to be combined with the new eTFI values can either be reserved or assigned dynamically. Thus, the number of 'Legacy TBFs' vs. the number of 'New TBFs' is fully controlled by the mobile network and can also be adjusted dynamically by the mobile network during operation.

Combining code points from legacy TFI addressing space with a new separate extended TFI field will be explained in more detail with reference to FIG. 2:

Assume that the sixteen legacy TFI values 0-15 (binary 00000 to 01111) are reserved to identify Legacy TBFs, and also assume that the sixteen legacy TFI values 16 through 31 (binary 10000 to 11111) are reserved for the 'New TFIs'.

Assume further that the size of the new eTFI field is 2 bits. Then it would be possible to obtain up to sixteen "Legacy TFIs" which can be used by "legacy mobile stations", as well as obtaining up to sixty-four 'eTFIs', as shown in the table in FIG. 2, if the legacy TFI code points used for the eTFIs range from 10000 up to 11111, as shown in FIG. 2. As shown in FIG. 2, the eTFI values are obtained by utilizing every combination of legacy TFIs and values in the eTFI field In general, if we assume that L legacy TFI code points are reserved for mobile stations capable of reading the eTFI fields, and if we furthermore assume that new code points of M bits are used for the eTFI, it will be possible to address 31−L legacy MSs and L*$2^M$ new devices, as illustrated by the table in FIG. 3. The table in FIG. 3 shows values of L, 31−L and M, where M ranges from 0 to 9, as well as showing the resulting value of L*$2^M$.

The "split" of which legacy TFI code points that are to be reserved for 'Legacy TBFs' and which legacy TFI code points to use in conjunction with the new eTFI field in order to obtain the eTFIs for use in identifying 'New TBFs', is decided by the GERAN mobile network. It will e.g. be perfectly possible for the mobile network to dynamically change how many code points that are reserved to which category (L in FIG. 3). Also, a new mobile station, i.e. one which can read the eTFI field can of course still be assigned 'Legacy TBFs' that do not use the new eTFI field to construct the full TFI.

It should also be pointed out that 9 bits as a value of M in FIG. 3 is by no means an optimal upper limit, and should only be considered as an example.

Furthermore, the above-mentioned split between code points for 'Legacy TBFs' and 'New TBFs' is suitably made dynamic in the sense that the legacy TFIs that are reserved for the eTFI information can be dynamically changed over time depending on the current mix of 'legacy mobile station (i.e. not capable of reading the eTFI field) and 'new mobile stations' (i.e. capable of reading the eTFI field) on the PDCH(s). The legacy TFI code points to be combined with eTFI values (for 'New TBFs'/'new mobile stations'), can of course also be assigned dynamically at setup or at a change of the TBF. If the allocation concerns a new mobile station, and there are currently no legacy TFI code points already combined with eTFI values and there are eTFI values available, a new legacy TFI code point is allocated by the mobile network and combined with eTFI values.

For each transmitted RLC/MAC data block, control block or PAN, there is a need to find "space" for the additional bits for the eTFI, i.e. those that are not located in a legacy TFI. Such "space" can, for example, be found in the RLC/MAC data block, RLC/MAC control block or a PAN. There are a number of possibilities in how and where the bits needed for the eTFI-field can be located; a listing is given below of such options, together with benefits of the respective possibility for the case of RLC/MAC data or control blocks. The eTFI are conveyed in the PAN in a slightly different manner, which will also be described below.

How to Convey the eTFI Field in RLC/MAC Data or Control Blocks:

Use the Spare Bits in the RLC/MAC Header

Many of the RLC/MAC header types have spare bits that are not used. These could be used to form the new eTFI field.

For the downlink transmitted RLC/MAC data blocks, the maximum number of spare bits in any downlink RLC/MAC header is 2. Hence according to the table in FIG. 3, this means that at most 62 'New TBFs' are assignable in this manner. Spare bits are however only available in downlink RLC/MAC Header Types 4 through 10 (see Section 10.3a.3 of 3GPP TS 44.060), and thus the solution is primarily suitable for EGPRS2B and to some extent EGPRS2A.

For the uplink transmitted RLC/MAC data blocks, the number of spare bits in the uplink RLC/MAC headers varies between 0 and 10. If we avoid the use of Header Type 3 (MCS 1-4), then this solution is fully feasible for EGPRS (without MCS 1-4) as well as for EGPRS2A and for EGPRS2B with at least 2 spare bits and thus again at the most 62 'New TBFs' are assignable in this manner.

For the RLC/MAC control blocks (regardless of direction, uplink or downlink) it can be assured that there are at least 4 spare bits available (see Section 10.3.1 of 3GPP TS 44.060), and thus at the most 240 'New TBFs' are assignable in this manner, which should be more than sufficient.

This option ensures that no channel coding is impacted, and hence full backwards compatibility is possible Define New Downlink RLC/MAC Blocks Another alternative is to define new downlink RLC/MAC blocks for all Modulation and Coding Schemes (MCSs), which already from the start contain the new eTFI field in the RLC/MAC header. This of course also means that there is a need to find the channel coding bits needed for the eTFI field. These coding bits thus needs to be taken from the coding bits of other parts of the downlink RLC/MAC block, such as e.g. from the Uplink State Flag, USF, from the user-plane data or perhaps from the rest of the RLC/MAC header. Regardless of which of these alternatives that is chosen, the channel-coding will need to be re-worked, making this less backwards compatible solution.

For RLC/MAC control blocks, there are already at least 4 bits available which translates into a maximum of 240 'New TBFs', which can be anticipated to be more than enough. If still needed, it is of course also possible to define new RLC/MAC control blocks in the same way.

In this alternative, the number of bits used for the eTFI as well as its robustness can be optimized in a more flexible manner than when only using the existing spare bits. This alternative also places no limitations on which EGPRS levels or MCSs that can be used.

Use the Length Indicator in the RLC Data Block

The length indicators used within the RLC data blocks are used to indicate the boundaries between upper layer PDUs in the RLC layer as described in section 10.4.14a of 3GPP TS 44.060.

One alternative for conveying the eTFI field in RLC/MAC data or control blocks is thus to define a new such reserved length indicator value (e.g. L I=125) which, when detected will e.g. indicate that the following octet will contain the eTFI value. Thus, the receiving RLC entity will be able to uniquely identify the TBF to which the RLC/MAC block belongs from the Legacy TFI value signaled in the RLC/MAC header (as is today), combined with the eTFI value signaled within the RLC data block in the manner described herein, with the aid of a particular length indicator value (e.g. LI=125). One additional benefit of this alternative is that for radio blocks that do contain multiple RLC data blocks (such as e.g. when using EGPRS and MSC-9 which contains 2 RLC data blocks per radio block), the different RLC data block within the radio block may belong to different TBFs, since a unique eTFI may be given for each RLC data block.

If we consider a scenario with multiple TBFs associated with one physical device, then this alternative would reduce the need of Legacy TFI values (which is the scarce resource here) to one per physical device. Any additional TBF sent to that particular device will use the same Legacy TFI value, but separate eTFI values.

In addition, this alternative has no impact on the physical layer or the coding etc.

How to Convey the eTFI Field in Piggy-Backed Ack/Nacks (PANs):

When FANR (Fast ACK/NACK reporting) is used, a Piggy Backed ACK/NACK, PAN, may be included in the downlink data. This PAN is encoded together with its CRC separately from the user data, and can in the same way as for the USF be addressed to another user than the one to which the downlink payload is addressed.

For SSN-based encoding of the PAN (see section 10.3a.5 of 3GPP TS 44.060), the present TFI field is 5 bits. There are a number of ways in which an eTFI field can be incorporated in the PAN, some of which are described below:

"Steal" Parts of the RB-Field for the eTFI Field.

The PAN contains a Reported Bitmap (RB) that is 8-12 bits long. How large it is depends on the size of the RLC window size according to: 18−[log$_2$(WS)], which e.g. if WS=256 equals 10 bits. It is thus possible to re-use a few of these bits for the eTFI field instead, or to just re-use one bit which (if set) indicates that the PAN is extended with the eTFI bits. Then, any number of eTFI bits can be used by "stealing" only one RB bit.

This is a very "clean" alternative that is fully back-wards compatible, given that both the mobile network and the mobile station have a common understanding of how to interpret these particular bits as will be discussed below.

XOR the PAN with eTFI Field as Well.

Today, the Legacy TFI value is actually not explicitly transmitted, but rather XOR:ed with the rest of the PAN, as described in 45.003, see for example section 5.1.5.1.4a.

It would of course be possible to let not only the Legacy TFI, but rather the Legacy TFI+eTFI together be XOR:ed with the PAN using the same principle.

This would give the same level of channel coding and thus robustness to the eTFI as the Legacy TFI.

Create a New PAN Field.

Similar to the alternative discussed above under the heading of "Define new downlink RLC/MAC blocks". It is of course possible to construct fully new PAN fields in a similar manner. The benefits will here be more or less the same as mentioned in that previous heading.

Signaling Aspects

Signaling from the mobile station to the mobile network, i.e. uplink signaling: Any mobile station capable of reading the eTFI in the manner as described in this invention obviously needs to make the mobile network aware of this capability. This can be achieved in a number of ways, where an obvious one is to let the mobile station indicate its capabilities thereof in the MS Radio Access Capability IE. Hence one (or more) additional bit should be added to this IE for this purpose.

An alternative solution is to introduce a new type of access burst in addition to the legacy ones. This access burst is then to be used by these new mobile stations. Whenever the mobile network detects such a new access burst, it will know that it originates from such a new mobile station that is capable of reading the eTFI field. The new access burst could e.g. be defined as a new code point in the 3GPP 44.060 EGPRS PACKET CHANNEL REQUEST message or by introducing a new training sequence that the new mobile station will use when transmitting the access request message (EGPRS PACKET CHANNEL REQUEST).

Signaling from the mobile network to the mobile station, i.e. uplink signaling: The information the network needs to provide to the device upon TBF assignment is thereafter:

The legacy TFI value used to fully or partially identify the TBF (reserved or dynamically assigned as described earlier).

An indication if the device shall interpret the legacy TFI in the legacy way (i.e. as a full legacy TFI identifying a legacy TBF) or in the new way (i.e. as a prefix for the eTFI field). If the latter is true, then in addition . . . .

. . . the new eTFI value assigned to identify the given TBF.

It is therefore an alternative according to the invention to include such information elements in the messages transmitted from the network to the device upon TBF assignment, i.e. the uplink and downlink assignment or reconfiguration messages as described in Section 11.2 of 3GPP TS 44.060, such as e.g. the Packet Downlink Assignment, Packet Uplink Assignment, Multiple TBF Downlink Assignment, Multiple TBF Uplink Assignment, Packet CS Release, Packet Timeslot Reconfigure Message or Multiple TBF Timeslot Reconfigure messages.

It should be noted that, even though this description has focused on new MTC devices, there is absolutely no reason why the invention could not be used for future HTC devices.

Figure 4:
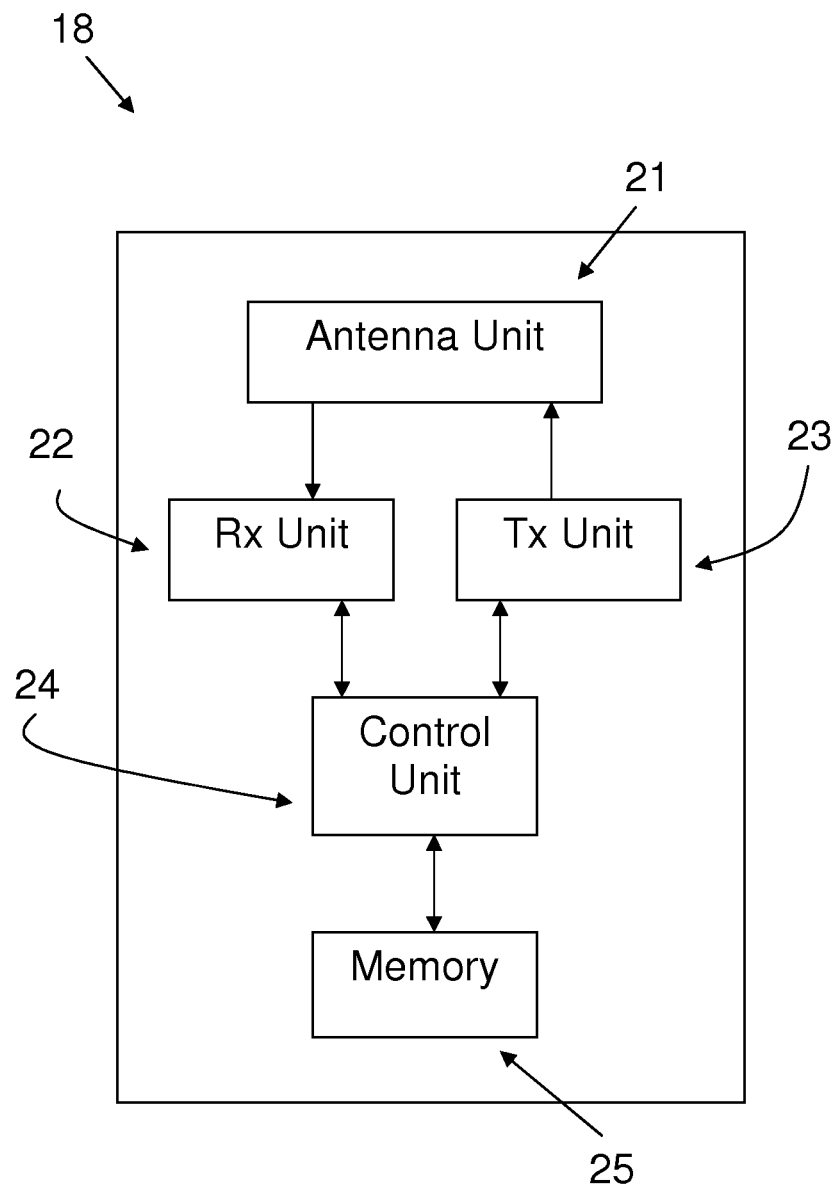
FIG. 4 shows a schematic block diagram of a mobile station of the invention.

A schematic block diagram of a mobile station 18 of the invention is shown in FIG. 4. As shown there, the mobile station 18 comprises an antenna unit 21 for communication with one or more RBSs 15, as well as comprising a receiver unit 22 and a transmitter unit 23, also used for communication with one or more RBSs 15.

The mobile station 18 also comprises a control unit 24, for control of the mobile station 18 in general, and also for control of the transmitter and receiver units in particular. In addition, the mobile station 18 also comprises a memory unit 25, where the mobile station may store parameters for operation as well as executable code for the control unit 24, if the control unit 24 is a processor of some kind, such as, for example, a microprocessor.

The mobile station 18 is intended for a mobile network such as the one 11 of FIG. 1, and is arranged to be assigned one or more Temporary Block Flows, TBFs, by the mobile network 11, and to receive RLC/MAC Blocks from the mobile network 18, each of which RLC/MAC Blocks is associated with one of said TBFs. The mobile station 18 receives the assignment of the TBFs as well as the RLC/MAC Blocks primarily by means of the antenna unit 21, the receiver unit 22 and the control unit 24.

In addition, the mobile station 18 is also arranged to identify a received RLC/MAC Block by means of a Temporary Flow Identity, TFI, which has been assigned by the mobile network 11 to the TBF with which the RLC/MAC Block is associated. This identification is carried out primarily by means of the Control Unit 21 and the Memory Unit 25.

The mobile station 18 is arranged to recognize TFIs which belong to a first group of TFIs as well as TFIs which belong to a second group of TFIs, where a TFI in the second group comprises a TFI in the first group of TFIs together with additional information in the received RLC/MAC block. This recognition is carried out primarily by means of the Control Unit 21 and the Memory Unit 25.

In embodiments, the mobile station 18 is arranged to transmit an RLC/MAC Block to the mobile network on a TBF, and to associate such a transmitted RLC/MAC Block with a TBF by means of a TFI which belongs to either the first group of TFIs or to the second group of TFIs. The transmission is primarily carried out by means of the transmitter unit 23 and the antenna unit 21, and the association of a transmitted RLC/MAC Block with a TBF by means of a TFI is primarily carried out by the Control Unit 24 and the Memory 25.

In embodiments, the mobile station 18 is arranged to inform the mobile network 11 of its ability to recognize TFIs which belong to the second group of TFIs and/or to associate transmitted RLC/MAC Blocks with a TBF by means of a TFI which belongs to the second group of TFIs. This is carried out by means of the control unit 24 and the transmitter unit 22 together with the antenna unit 21.

In embodiments, the mobile station 18 is arranged to inform the mobile network 11 of its ability with the eTFIs by means of the Information Element MS Radio Access. The mobile station 18 is arranged to use one bit in the Information Element for this purpose, although, of course, more than one bit can also be used for this purpose. In some such embodiments, the mobile station 18 is arranged to inform the mobile network 11 of this ability by means of an access burst. The access burst is transmitted by means of the transmit unit 23 and the antenna unit 21, controlled by the control unit 24. In some such embodiments, the access burst is a binary value in the message EGPRS PACKET CHANNEL REQUEST, while in other such embodiments, the access burst is a training sequence that the mobile station 18 uses when it transmits the message EGPRS PACKET CHANNEL REQUEST.

In embodiments, the mobile station 18 is arranged to receive information from the mobile network 11 that the mobile station 18 should use information in at least some of the first group of TFIs together with information in an RLC/MAC header in order to identify a TFI which belongs to the second group of TFI. Such information is received via the antenna unit 21 and the receiver unit 22, and processed by the control unit 24. In some such embodiments, the mobile station 18 is arranged to receive the information from the mobile network 11 upon assignment to the mobile station 18 from the mobile network 11 of a new TBF or reconfiguring of a TBF. In other such embodiments, the mobile station 18 is arranged to receive the information in an RLC/MAC header in the Length Indicator in an RLC data block.

In different embodiments, the mobile station 18 is a mobile station for a GERAN mobile network, or alternatively, a mobile station which can handle both those types of networks.

Figure 5:
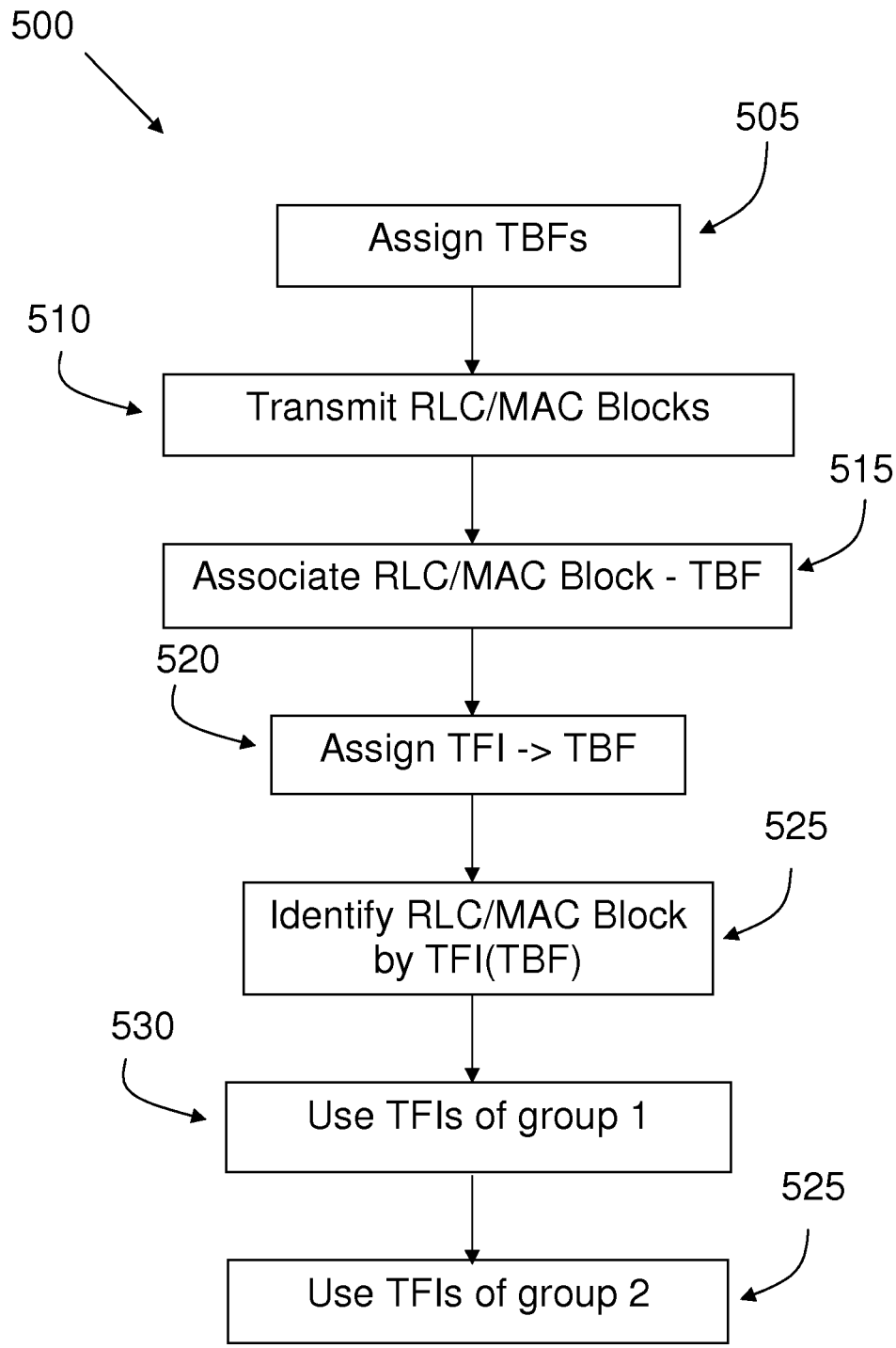
FIG. 5 shows a schematic flow chart of a method of the invention.

FIG. 5 shows a schematic flow chart of a method 500 of the invention. The method 500 is intended for use in communication between a mobile network such as the one 11 and a mobile station such as the one 18, and comprises assigning, step 505, Temporary Block Flows, TBFs, to the mobile station and transmitting, step 510, RLC/MAC Blocks from the mobile network to the mobile station. The method also comprises associating, step 515, each transmitted RLC/MAC Block with a TBF, and assigning, step 520, a Temporary Flow Identity, a TFI, to each TBF, and identifying, step 525, in the mobile station, an RLC/MAC Block by means of the TFI of its associated TBF. The method 500 comprises, step 530, the use of TFIs which belong to a first group of TFIs, and also comprises, step 535, the use of TFIs which belong to a second group of TFIs. The method 500 further comprises forming the TFIs of the second group of TFIs by means of a TFI in the first group together with additional information in the received RLC/MAC block.

In embodiments, the method 500 comprises assigning Temporary Block Flows, TBFs, for the transmission of RLC/MAC Blocks from the mobile station 18 to the mobile network, and associating TFIs of the first or second group with those TBFs.

In embodiments, according to the method 500, a mobile station informs the mobile network that it can recognize TFIs which belong to the second group of TFIs and/or that the mobile station can associate a transmitted RLC/MAC Block with a TBF by means of a TFI which belongs to the second group of TFIs. In embodiments, a mobile station informs the mobile network of this by means of the Information Element MS Radio Access, in which Information Element the mobile station uses one bit for this purpose. In other embodiments, according to the method 500, a mobile station informs the mobile network of this by means of an access burst. In some such embodiments, the access burst is a binary value in the message EGPRS PACKET CHANNEL REQUEST, and in other such embodiments, the access burst is a training sequence that the mobile station uses when transmitting the message EGPRS PACKET CHANNEL REQUEST.

In embodiments, the method 500 comprises transmitting information from the mobile network to the mobile station that the mobile station should use information in at least some of the first group of TFIs together with information in an RLC/MAC header in order to form a TFI which belongs to the second group of TFI. In embodiments, the method 500 comprises transmitting this information from the mobile network upon assignment of a new TBF or reconfiguration of a TBF to the mobile station, and in other embodiments, the method comprises including this information in an RLC/MAC header in the Length Indicator in an RLC data block.

In embodiments, the method is applied in a GERAN mobile network.

The invention also discloses a mobile network such as the one 11 in FIG. 1, which is arranged to assign one or more Temporary Block Flows, TBFs, to a mobile station such as the one 18 in FIG. 1. The mobile network is also arranged to assign a Temporary Flow Identity, TFI, to each of the TBFs and to transmit RLC/MAC Blocks to the mobile station. In addition, the mobile network is also arranged to associate each transmitted RLC/MAC Block with one of said TBFs by means of a TFI.

The mobile network is arranged to choose the TFIs from a first or a second group of TFIs, and to let the TFIs of the second group be formed by information in at least some of the first group of TFIs and information in an RLC/MAC Block.

In embodiments, the mobile network 11 is arranged to receive RLC/MAC Blocks from a mobile station 18 and to identify such received RLC/MAC Blocks by means of a TFI from the first or the second group of TFIs.

In embodiments, the mobile network 11 is arranged to receive information from a mobile station 18 that the mobile station 18) is arranged to recognize TFIs which belong to the second group of TFIs and/or to associate transmitted RLC/MAC Blocks with a TBF by means of a TFI which belongs to the second group of TFIs. In some such embodiments, the mobile network 11 is arranged to receive this information from a mobile station 18 by means of the Information Element MS Radio Access, in which Information Element the mobile station 18 uses one bit for this purpose, and in other embodiments, the mobile network 11 is arranged to receive this information from a mobile station 18 by means of an access burst.

In some embodiments, the mobile network 11 is arranged to receive the access burst as a binary value in the message EGPRS PACKET CHANNEL REQUEST, and in other embodiments, the mobile network 11 is arranged to receive the access burst as a training sequence that the mobile station 18 uses when transmitting the message EGPRS PACKET CHANNEL REQUEST.

In embodiments, the mobile network 11 is arranged to transmit information to the mobile station 18 to use information in at least some of the first group of TFIs together with information in an RLC/MAC Block in order to form a TFI which belongs to the second group of TFI. In some such embodiments, the mobile network 11 is arranged to transmit this information to the mobile station 18 upon assignment to the mobile station 18 of a new TBF, or reconfiguration of a TBF to the mobile station 18, and in some embodiments, the mobile network 11 is arranged to place this information in an RLC/MAC header in the Length Indicator in an RLC data block.

In embodiments, the mobile network 11 is a GERAN mobile network.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A mobile station for use with a mobile network, the mobile station comprising:
a processor and a memory, said memory containing code executable by said processor whereby said mobile station is configured to:
receive RLC/MAC (Radio Link Control/Medium Access Control) Blocks from the mobile network, each received RLC/MAC Block associated with one of one or more Temporary Block Flows (TBFs) assigned to the mobile station by the mobile network; and
identify a received RLC/MAC Block by a Temporary Flow Identity (TFI) that has been assigned by the mobile network to the TBF with which the RLC/MAC Block is associated and that, as recognized by the mobile station, belongs to either a first group of TFIs or a second group of TFIs, wherein a TFI in the second group comprises a TFI in the first group together with additional information in the received RLC/MAC block;
wherein a first Portion of values for TFIs in the first group are dedicated to uniquely identifying TBFs on a given resource without said additional information, and a second portion of values for TFIs in the first group are dedicated to uniquely identifying TBFs on a given resource in combination with said additional information.

2. The mobile station of claim 1, wherein said memory contains code executable by said processor whereby said mobile station is further configured to transmit an RLC/MAC Block to the mobile network on a TBF, and associate the transmitted RLC/MAC Block with a TBF using a TFI which belongs to either the first group of TFIs or to the second group of TFIs.

3. The mobile station of claim 1, wherein said memory contains code executable by said processor whereby said mobile station is further configured to:
inform the mobile network of its ability to recognize TFIs which belong to the second group of TFIs;
associate transmitted RLC/MAC Blocks with a TBF using a TFI which belongs to the second group of TFIs; or
both.

4. The mobile station of claim 3, wherein said memory contains code executable by said processor whereby said mobile station is further configured to inform the mobile network of said ability using one bit of the Information Element MS Radio Access Capability.

5. The mobile station of claim 3, wherein said memory contains code executable by said processor whereby said mobile station is further configured to inform the mobile network of said ability using an access burst.

6. The mobile station of claim 5, wherein said access burst is a binary value in the message EGPRS PACKET CHANNEL REQUEST.

7. The mobile station of claim 5, wherein said access burst is a training sequence that the mobile station uses when transmitting the message EGPRS PACKET CHANNEL REQUEST.

8. The mobile station of claim 1, wherein said memory contains code executable by said processor whereby said mobile station is further configured to receive information from the mobile network that directs the mobile station to use information in at least some of the first group of TFIs together with information in an RLC/MAC Block in order to identify a TFI which belongs to the second group of TFIs.

9. The mobile station of claim 8, wherein said memory contains code executable by said processor whereby said mobile station is further configured to receive said information from the mobile network upon assignment of a TBF to the mobile station by the mobile network or upon reconfiguration of a TBF by the mobile network.

10. The mobile station of claim 1, wherein the mobile station is for use in a GERAN (GSM EDGE Radio Access Network) mobile network.

11. The mobile station of claim 1, wherein said memory contains code executable by said processor whereby said mobile station is further configured to identify a first received RLC/MAC Block by a TFI that, as recognized by the mobile station, belongs to the first group of TFIs and to identify a second received RLC/MAC Block by a TFI that, as recognized by the mobile station, belongs to the second group of TFIs.

12. A method implemented by a mobile station configured for use with a mobile network, the method comprising:
receiving RLC/MAC (Radio Link Control/Medium Access Control) Blocks from the mobile network, each received RLC/MAC Block associated with one of one or more Temporary Block Flows (TBFs) assigned to the mobile station by the mobile network; and
identifying a received RLC/MAC Block by a Temporary Flow Identity (TFI) that has been assigned by the mobile network to the TBF with which the RLC/MAC Block is associated and that, as recognized by the mobile station, belongs to either a first group of TFIs or a second group of TFIs, wherein a TFI in the second group comprises a TFI in the first group together with additional information in the received RLC/MAC block;

wherein a first portion of values for TFIs in the first group are dedicated to uniquely identifying TBFs on a given resource without said additional information, and a second portion of values for TFIs in the first group are dedicated to uniquely identifying TBFs on a given resource in combination with said additional information.

13. The method of claim 12, further comprising informing the mobile network that the mobile station can at least one of:
recognize TFIs which belong to the second group of TFIs; and
associate a transmitted RLC/MAC Block with a TBF using a TFI which belongs to the second group of TFIs.

14. The method of claim 13, wherein said informing comprises transmitting to the mobile network one bit of the Information Element MS Radio Access.

15. The method of claim 13, wherein said informing comprises transmitting an access burst to the mobile network.

16. The method of claim 15, wherein said access burst is a binary value in the message EGPRS PACKET CHANNEL REQUEST.

17. The method of claim 15, wherein said access burst is a training sequence that the mobile station uses when transmitting the message EGPRS PACKET CHANNEL REQUEST.

18. The method of claim 12, further comprising receiving information from the mobile network that directs the mobile station to use information in at least some of the first group of TFIs together with information in an RLC/MAC header in order to form a TFI which belongs to the second group of TFIs.

19. The method of claim 18, wherein said receiving comprises receiving said information from the mobile network upon assignment of a new TBF to the mobile station or reconfiguration of a TBF by the mobile network.

20. The method of claim 12, wherein said receiving comprises receiving said information in an RLC/MAC header in the Length Indicator in an RLC data block.

21. The method of claim 12, wherein the mobile station is configured for use with a GERAN (GSM EDGE Radio Access Network) mobile network.

22. The method of claim 12, further comprising identifying a first received RLC/MAC Block by a TFI that, as recognized by the mobile station, belongs to the first group of TFIs and identifying a second received RLC/MAC Block by a TFI that, as recognized by the mobile station, belongs to the second group of TFIs.

23. A mobile network configured to:
assign one or more Temporary Block Flows (TBFs) to a mobile station;
transmit RLC/MAC (Radio Link Control/Medium Access Control) Blocks to the mobile station;
associate a transmitted RLC/MAC Block with one of said TBFs; and
assign to said one TBF a Temporary Flow Identity (TFI) chosen from a first or a second group of TFIs, the TFIs in the second group formed using a TFI in the first group and information in the transmitted RLC/MAC Block;
wherein a first portion of values for TFIs in the first group are dedicated to uniquely identifying TBFs on a given resource without said information, and a second portion of values for TFIs in the first group are dedicated to uniquely identifying TBFs on a given resource in combination with said information.

24. The mobile network of claim 23, configured to receive RLC/MAC Blocks from a mobile station and to identify the received RLC/MAC Blocks using a TFI from the first or the second group of TFIs.

25. The mobile network of claim 23, configured to receive information from a mobile station that the mobile station is configured to at least one of:
recognize TFIs which belong to the second group of TFIs and
associate transmitted RLC/MAC Blocks with a TBF by means of a TFI which belongs to the second group of TFIs.

26. The mobile network of claim 25, configured to receive said information using one bit of the Information Element MS Radio Access Capability.

27. The mobile network of claim 25, configured to receive said information via an access burst received from the mobile station.

28. The mobile network of claim 27, configured to receive said access burst as a binary value in the message EGPRS PACKET CHANNEL REQUEST.

29. The mobile network of claim 27, configured to receive said access burst as a training sequence that the mobile station uses when transmitting the message EGPRS PACKET CHANNEL REQUEST.

30. The mobile network of claim 23, configured to transmit information to the mobile station that directs the mobile station to use information in at least some of the first group of TFIs together with information in an RLC/MAC Block in order to form a TFI which belongs to the second group of TFI.

31. The mobile network of claim 30, configured to transmit said information to the mobile station upon assignment to the mobile station of a new TBF, or reconfiguration of a TBF.

32. The mobile network of claim 30, configured to place said information in an RLC/MAC header in the Length Indicator in an RLC data block.

33. The mobile network of claim 23, wherein the mobile network comprises a GERAN (GSM EDGE Radio Access Network) mobile network.

34. The mobile network of claim 23, wherein the mobile network is configured to associate a first transmitted RLC/MAC Block with a first one of said TBFs and to assign to said first TBF a TFI chosen from the first group of TFIs, and to associate a second transmitted RLC/MAC Block with a second one of said TBFs and to assign to said second TBF a TFI chosen from the second group of TFIs.

35. A method implemented by a mobile network, the method comprising:
assigning one or more Temporary Block Flows (TBFs) to a mobile station;
transmitting RLC/MAC (Radio Link Control/Medium Access Control) Blocks to the mobile station;
associating a transmitted RLC/MAC Block with one of said TBFs; and
assigning to said one TBF a Temporary Flow Identity (TFI) chosen from a first or a second group of TFIs, the TFIs in the second group formed using a TFI in the first group and information in the transmitted RLC/MAC Block;
wherein a first portion of values for TFIs in the first group are dedicated to uniquely identifying TBFs on a given resource without said information, and a second portion of values for TFIs in the first group are dedicated to uniquely identifying TBFs on a given resource in combination with said information.

36. The method of claim 35, further comprising:
associating a first transmitted RLC/MAC Block with a first one of said TBFs;
assigning to said first TBF a TFI chosen from the first group of TFIs;
associating a second transmitted RLC/MAC Block with a second one of said TBFs; and
assigning to said second TBF a TFI chosen from the second group of TFIs.

* * * * *